United States Patent
Rodriguez-Serrano et al.

(10) Patent No.: US 9,412,031 B2
(45) Date of Patent: Aug. 9, 2016

(54) DELAYED VEHICLE IDENTIFICATION FOR PRIVACY ENFORCEMENT

(71) Applicant: Xerox Corporation, Norwalk, CT (US)

(72) Inventors: Jose Antonio Rodriguez-Serrano, Grenoble (FR); Florent C. Perronnin, Domene (FR); Herve Poirier, Meylan (FR); Frederic Roulland, Le Versoud (FR); Victor Ciriza, Sant Martin d'Uriage (FR)

(73) Assignee: XEROX CORPORATION, Norwalk, CT (US)

( * ) Notice: Subject to any disclaimer, the term of this patent is extended or adjusted under 35 U.S.C. 154(b) by 217 days.

(21) Appl. No.: 14/054,998

(22) Filed: Oct. 16, 2013

(65) Prior Publication Data

US 2015/0104073 A1  Apr. 16, 2015

(51) Int. Cl.
*G06K 9/32* (2006.01)
*G06F 17/30* (2006.01)
*G06K 9/00* (2006.01)
*G06K 9/62* (2006.01)

(52) U.S. Cl.
CPC ........ *G06K 9/3258* (2013.01); *G06F 17/30253* (2013.01); *G06K 9/00791* (2013.01); *G06K 9/6212* (2013.01); *G06K 9/6277* (2013.01); *G06K 2209/15* (2013.01); *G06K 2209/27* (2013.01)

(58) Field of Classification Search
CPC .................................. H04L 9/32; G06K 9/32
See application file for complete search history.

(56) References Cited

U.S. PATENT DOCUMENTS

| 4,433,325 | A |   | 2/1984  | Tanaka et al. |
| 5,081,685 | A | * | 1/1992  | Jones, III ............. G06K 9/2054  382/105 |
| 5,083,200 | A |   | 1/1992  | Deffontaines |
| 5,592,567 | A |   | 1/1997  | Kilger |
| 5,809,161 | A |   | 9/1998  | Auty et al. |
| 5,995,900 | A |   | 11/1999 | Hsaio et al. |
| 6,076,026 | A | * | 6/2000  | Jambhekar ........... G07C 5/0858  340/426.22 |

(Continued)

FOREIGN PATENT DOCUMENTS

EP       2 615 572 A1    7/2013
WO   WO 2008/100358 A1  8/2008

OTHER PUBLICATIONS

U.S. Appl. No. 13/527,228, filed Jun. 19, 2012, Skaff, et al.

(Continued)

*Primary Examiner* — Chan Park
*Assistant Examiner* — Mia M Thomas
(74) *Attorney, Agent, or Firm* — Fay Sharpe LLP (57) ABSTRACT

A method for recognition of an identifier such as a license plate includes storing first visual signatures, each extracted from a first image of a respective object, such as a vehicle, captured at a first location, and first information associated with the first captured image, such as a time stamp. A second visual signature is extracted from a second image of a second object captured at a second location and second information associated with the second captured image is acquired. A measure of similarity is computed between the second visual signature and at least some of the first visual signatures to identify a matching one. A test is performed, which is a function of the first and the second information associated with the matching signatures. Only when it is confirmed that the test has been met, identifier recognition is performed to identify the identifier of the second object.

20 Claims, 6 Drawing Sheets

(56) References Cited

U.S. PATENT DOCUMENTS

| | | | |
|---|---|---|---|
| 6,747,687 B1* | 6/2004 | Alves | H04N 7/188 340/932.2 |
| 6,934,392 B1* | 8/2005 | Vanstone | H04L 9/0844 380/278 |
| 6,996,255 B2 | 2/2006 | Sakuma et al. | |
| 7,093,131 B1* | 8/2006 | Kobayashi | H04L 9/3247 380/258 |
| 8,879,796 B2* | 11/2014 | Rodriguez Serrano | G06K 9/325 382/105 |
| 8,964,031 B2* | 2/2015 | Clucas | G06T 7/2033 348/143 |
| 2001/0010028 A1* | 7/2001 | Thibault | G07C 5/008 701/29.6 |
| 2002/0103577 A1* | 8/2002 | Newport | B60R 13/10 701/1 |
| 2003/0021481 A1 | 1/2003 | Kasutani | |
| 2006/0017562 A1* | 1/2006 | Bachelder | G08G 1/017 340/531 |
| 2007/0005356 A1 | 1/2007 | Perronnin | |
| 2007/0208681 A1* | 9/2007 | Bucholz | G08G 1/017 706/47 |
| 2007/0258648 A1 | 11/2007 | Perronnin | |
| 2008/0024323 A1* | 1/2008 | Kadaba | G01N 33/0075 340/905 |
| 2008/0069456 A1 | 3/2008 | Perronnin | |
| 2008/0192116 A1* | 8/2008 | Tamir | G06T 7/2093 348/157 |
| 2008/0240572 A1 | 10/2008 | Hoshii | |
| 2008/0247551 A1* | 10/2008 | Iwamoto | H04N 1/32133 380/278 |
| 2008/0317358 A1 | 12/2008 | Bressan et al. | |
| 2009/0144033 A1 | 6/2009 | Liu et al. | |
| 2009/0202105 A1* | 8/2009 | Castro Abrantes | G07B 15/06 382/100 |
| 2009/0208059 A1* | 8/2009 | Geva | G06K 9/3258 382/105 |
| 2009/0208118 A1 | 8/2009 | Csurka | |
| 2009/0252380 A1* | 10/2009 | Shimizu | G08G 1/163 382/107 |
| 2010/0040285 A1 | 2/2010 | Csurka et al. | |
| 2010/0082615 A1 | 4/2010 | Clinchant et al. | |
| 2010/0092084 A1 | 4/2010 | Perronnin et al. | |
| 2010/0098343 A1 | 4/2010 | Peronnin et al. | |
| 2010/0151213 A1* | 6/2010 | Smithson | B60R 13/10 428/195.1 |
| 2010/0189354 A1 | 7/2010 | de Campos et al. | |
| 2010/0191743 A1 | 7/2010 | Perronnin et al. | |
| 2010/0226564 A1 | 9/2010 | Marchesotti et al. | |
| 2010/0241528 A1* | 9/2010 | Hedges | G06Q 30/0601 705/26.1 |
| 2010/0318477 A1 | 12/2010 | Perronnin et al. | |
| 2011/0026831 A1 | 2/2011 | Perronnin et al. | |
| 2011/0040711 A1 | 2/2011 | Perronnin et al. | |
| 2011/0052063 A1 | 3/2011 | McAuley et al. | |
| 2011/0072012 A1 | 3/2011 | Ah-Pine et al. | |
| 2011/0091105 A1 | 4/2011 | Perronnin | |
| 2011/0137898 A1 | 6/2011 | Gordo et al. | |
| 2011/0184950 A1 | 7/2011 | Skaff et al. | |
| 2011/0212717 A1* | 9/2011 | Rhoads | G06F 17/30241 455/420 |
| 2011/0282542 A9* | 11/2011 | Nielsen | G07C 5/085 701/31.4 |
| 2012/0022719 A1* | 1/2012 | Matos | B64C 39/024 701/2 |
| 2012/0045134 A1 | 2/2012 | Perronnin et al. | |
| 2012/0076401 A1 | 3/2012 | Sanchez et al. | |
| 2012/0106801 A1* | 5/2012 | Jackson | G08G 1/205 382/105 |
| 2012/0143853 A1 | 6/2012 | Gordo et al. | |
| 2012/0158739 A1 | 6/2012 | Ah-Pine et al. | |
| 2012/0263352 A1* | 10/2012 | Fan | G06K 9/3258 382/105 |
| 2013/0050492 A1* | 2/2013 | Lehning | G06K 9/00785 348/148 |
| 2013/0060786 A1 | 3/2013 | Rodriguez-Serrano et al. | |
| 2013/0093886 A1* | 4/2013 | Rothschild | G08G 1/0175 348/148 |
| 2013/0129151 A1 | 5/2013 | Rodriguez-Serrano et al. | |
| 2013/0129152 A1 | 5/2013 | Rodriguez-Serrano et al. | |
| 2013/0182909 A1* | 7/2013 | Rodriguez-Serrano | G06K 9/34 382/105 |
| 2013/0208121 A1* | 8/2013 | Wu | G08G 1/0175 348/149 |
| 2013/0259314 A1 | 10/2013 | Kozitsky et al. | |
| 2013/0266139 A1* | 10/2013 | Abl | H04L 63/0428 380/255 |
| 2013/0272579 A1* | 10/2013 | Burry | G06K 9/3258 382/105 |
| 2014/0036076 A1* | 2/2014 | Nerayoff | H04N 7/181 348/148 |
| 2014/0079297 A1* | 3/2014 | Tadayon | G06K 9/00 382/118 |
| 2014/0267725 A1* | 9/2014 | Smith | H04N 7/18 348/148 |
| 2014/0307923 A1* | 10/2014 | Johansson | G06K 9/00624 382/105 |
| 2014/0328518 A1* | 11/2014 | Kozitsky | G06K 9/2018 382/105 |
| 2015/0049914 A1* | 2/2015 | Alves | G06K 9/325 382/105 |
| 2015/0077548 A1* | 3/2015 | Meredith | H04N 7/183 348/143 |
| 2015/0172056 A1* | 6/2015 | Meunier | H04L 9/3242 380/28 |

OTHER PUBLICATIONS

U.S. Appl. No. 13/592,961, filed Aug. 23, 2012, Rodriguez-Serrano.
U.S. Appl. No. 13/757,014, filed Feb. 1, 2013, Rodriguez-Serrano, et al.
U.S. Appl. No. 13/836,310, filed Mar. 15, 2013, Wu, et al.
U.S. Appl. No. 13/903,218, filed May 28, 2013, Rodriguez-Serrano, et al.
U.S. Appl. No. 13/973,330, filed Aug. 22, 2013, Bernal, et al.
Rodriguez-Serrano, et al. "Data-driven vehicle identification by image matching" *12th European Conference on Computer Vision*, Firenze, Italy, Oct. 7-13, 2012, vol. 7584, pp. 536-545.
Xerox. "Transportation Solutions Offering a Spectrum of Services Worldwide", Xerox Corporation, 2012, pp. 1-8.
Lowe, et al. "Distinctive Image Features from scale-invariant keypoints" IJCV, 2004, vol. 60, pp. 91-110.
Perronnin, et al. "Fisher kernels on visual vocabularies for image categorization" CVPR, 2007, pp. 1-8.
Perronnin, et al. "Improving the fisher kernel for large-scale image classification" ECCV, 2010, pp. 143-156.
Sanchez, et al. "High-dimensional signature compression for large-scale image classification" CVPR 2011, pp. 1665-1672.
Csurka, et al. "Visual categorization with bags of keypoints" ECCV Workshop, 2004, pp. 1-16.
Lazebnik, et al. "Beyond bags of features: spatial pyramid matching for recognizing natural scene categories" CVPR '06, Proc. 2006 IEEE Computer Society Conf. on Computer Vision and Pattern Recognition, vol. 2, pp. 2169-2178.
Jegou, et al. "Aggregating local image descriptors into compact codes" IEEE TPAMI, 2012, 34(9): 1704-1716.
Wikipedia. "Automatic number plate recognition" Retrieved from http://en.wikipedia.org/wiki/Automatic_number_plate_recognition , on Aug. 8, 2013, pp. 1-16.
Jenoptik. "Software-intelligence for numberplate recognition and real-time comparison" Retrieved from http://www.jenoptik.com/en-automatic-numberplate-recognition-systems-trafficcapture , on Aug. 8, 2013, pp. 1-2.
Privacy International. "Netherlands" Retrieved from https://www.privacyinternational.org/reports.netherlands, on Aug. 8, 2013, pp. 1-2.
Sanchez, et al. "Image classification with the Fisher Vector: Theory and Practice" Version 3, Jun. 12, 2013, Informatics mathematics, Research Report No. 8209, pp. 1-24.

* cited by examiner

DELAYED VEHICLE IDENTIFICATION FOR PRIVACY ENFORCEMENT

BACKGROUND

The exemplary embodiment relates to object recognition and finds particular application in connection with a system and method for delaying the identification of an identifier for a vehicle until a condition is satisfied.

Vehicle identification can be defined as the process of measuring a set of properties of a vehicle with one or multiple sensors and mapping it to a unique identifier. Visual sensors (e.g., cameras) are often used to capture an image containing a license plate and then an Automatic License Plate Recognition (ALPR) process is applied. Given an image containing a vehicle license plate, ALPR systems typically output the license plate number of the vehicle, which constitutes a unique identifier. The recognized identifier can be used for different purposes, such as automatic collection of tolls, enforcement, such as detection of speed violations, management of car parks, data mining for analysis of traffic patterns, and the like.

However, automatic vehicle identification poses some concerns for privacy rights, since the acquirer of the vehicle identifier, such as a car park owner, possesses data that can often be traced to the vehicle owner. There is also a risk that unauthorized persons may be able to access the data and use it for purposes other than the legitimate purposes for which it was collected.

In some countries, therefore, governments and citizens are becoming more concerned about the collection of such data and restrictions are being placed on its collection. The storage of a vehicle identifier in persistent memory has been recognized as a violation of the right to privacy in some European countries. To address this, number plate recognition system have been developed that place each passing vehicle identifier in temporary storage and access it directly in real-time to check for exceptional situations (such as a vehicle exceeding a speed limit). If there is no match, the data is not permanently stored.

Even where there is no government regulation, there is pressure to modify the process of automatic vehicle identification in car parks and other locations, including processing and storage of the identities, in order to preserve the privacy of the car park users.

There remains a need for a system and method which provides for the recognition of a unique identifier of an object, such as a vehicle, while preserving the privacy of persons associated with the identifier where there is no specific need to process the identifier.

INCORPORATION BY REFERENCE

The following references, the disclosures of which are incorporated herein by reference in their entireties, are mentioned:

U.S. Pub. No. 20100226564, entitled FRAMEWORK FOR IMAGE THUMBNAILING BASED ON VISUAL SIMILARITY, by Luca Marchesotti, et al.

U.S. Pub. No. 20120143853, published on Jun. 7, 2012, entitled LARGE-SCALE ASYMMETRIC COMPARISON COMPUTATION FOR BINARY EMBEDDINGS, by Albert Gordo, et al.

U.S. Pub. No. 20130060786, published Mar. 7, 2013, entitled TEXT-BASED SEARCHING OF IMAGE DATA, by José Antonio Rodriguez Serrano, et al.

U.S. Pub. No. 20130129151, published May 23, 2013, entitled METHODS AND SYSTEMS FOR IMPROVED LICENSE PLATE SIGNATURE MATCHING BY SIMILARITY LEARNING ON SYNTHETIC IMAGES, by José Antonio Rodriguez Serrano, et al.

U.S. Pub. No. 20130129152, published May 23, 2013, entitled METHODS AND SYSTEMS FOR IMPROVING YIELD IN WANTED VEHICLE SEARCHES, by José Antonio Rodriguez Serrano, et al.

U.S. Pub. No. 20130182909, published Jul. 18, 2013, entitled IMAGE SEGMENTATION BASED ON APPROXIMATION OF SEGMENTATION SIMILARITY, by José Antonio Rodriguez Serrano.

U.S. Pub. No. 20130259314, published Oct. 3, 2013, entitled METHODS AND SYSTEMS FOR ENHANCING THE PERFORMANCE OF AUTOMATED LICENSE PLATE RECOGNITION APPLICATIONS UTILIZING MULTIPLE RESULTS, by Vladimir Kozitsky, et al.

U.S. application Ser. No. 13/527,228, filed Jun. 19, 2012, entitled OCCUPANCY DETECTION FOR MANAGED LANE ENFORCEMENT BASED ON LOCALIZATION AND CLASSIFICATION OF WINDSHIELD IMAGES, by Sandra Skaff, et al.

U.S. application Ser. No. 13/592,961, filed on Aug. 23, 2012, entitled REGION REFOCUSING FOR DATA-DRIVEN OBJECT LOCALIZATION, by José Antonio Rodriguez Serrano.

U.S. application Ser. No. 13/757,014, filed on Feb. 1, 2013, entitled LABEL-EMBEDDING FOR TEXT RECOGNITION, by José Antonio Rodriguez Serrano, et al.

U.S. application Ser. No. 13/836,310, filed on Mar. 15, 2013, entitled METHODS AND SYSTEM FOR AUTOMATED IN-FIELD HIERARCHICAL TRAINING OF A VEHICLE DETECTION SYSTEM, by Wencheng Wu, et al.

U.S. application Ser. No. 13/903,218, filed May 28, 2013, entitled SYSTEM AND METHOD FOR OCR OUTPUT VERIFICATION, by José Antonio Rodriguez Serrano, et al.

U.S. application Ser. No. 13/973,330, filed Aug. 22, 2013, entitled SYSTEM AND METHOD FOR OBJECT TRACKING AND TIMING ACROSS MULTIPLE CAMERA VIEWS, by Edgar A. Bernal, et al.

BRIEF DESCRIPTION

In accordance with one aspect of the exemplary embodiment a method for recognition of an identifier. The method includes, for each of a plurality of objects, storing a first visual signature, which has been extracted from at least a part of a first image of the object captured at a first location, and first information associated with the first captured image. A measure of similarity is computed between a second visual signature and at least some of the first visual signatures to identify a matching one of the first visual signatures, based on the computed measure of similarity. The second visual signature has been extracted from at least a part of a second image of a second object captured at a second location, based on at least a part of the second image. The stored first information associated with the matching one of the first visual signatures and stored second information associated with the second captured image are both retrieved. A test is performed which is a function of the retrieved stored first information and the stored second information. The method further includes providing for recognizing an identifier of the second object based on a captured image of the second object, when it is confirmed that the test is met. One or more of the steps of the method may be performed with a computer processor.

In accordance with another aspect of the exemplary embodiment a system for recognition of an identifier includes memory which, for each of a plurality of objects, stores first and second visual signatures. The first visual signature has been extracted from at least a part of a first image of the object captured at a first location. The second visual signature has been extracted from at least a part of a second image of the object captured at a second location. Memory also stores first information associated with the first visual signature, and second information associated with the second visual signature. A signature matching component computes a measure of similarity between one of the second visual signatures and each of at least some of the first visual signatures to identify a matching one of the first visual signatures, based on the computed measure of similarity. An information processing component performs a test which is a function of the retrieved stored first information associated with the matching one of the first visual signatures and the stored second information associated with the one of the second visual signatures. When it is confirmed that the test is met, an identifier recognition component recognizes an identifier of one of the objects based on a captured image of the second object. A processor implements the signature matching component, the information processing component, and the identifier recognition component.

In accordance with another aspect of the exemplary embodiment a method for recognition of a vehicle identifier includes, for each of a plurality of vehicles, capturing a first image of the vehicle at a first location at a first time and capturing a second image of the vehicle at a second location at a second time, later than the first time, acquiring first information associated with the capture of the first image and second information associated with the capture of the second image, the first and second information each comprising a respective time stamp. A first visual signature is computed based on at least a part of the first image of the vehicle. A second visual signature is computed based on at least a part of the first image of the vehicle. Each of the first visual signatures is stored, linked to the respective first information. Each of the second visual signatures is stored, linked to the respective second information. A measure of similarity between one of the second visual signatures and at least some of the first visual signatures is computed to identify a matching one of the first visual signatures, based on the computed measure of similarity. The stored first information associated with the matching one of the first visual signatures and stored second information associated with the one of the second visual signatures are both retrieved. A test is performed which is a function of the time stamps of the retrieved stored first information and the retrieved stored second information. Provision is made for recognizing an identifier of one of the vehicles based on the captured second image of the vehicle when it is confirmed that the test is met. One or more of the steps of the method may be performed with a computer processor.

DETAILED DESCRIPTION

Figure 1:
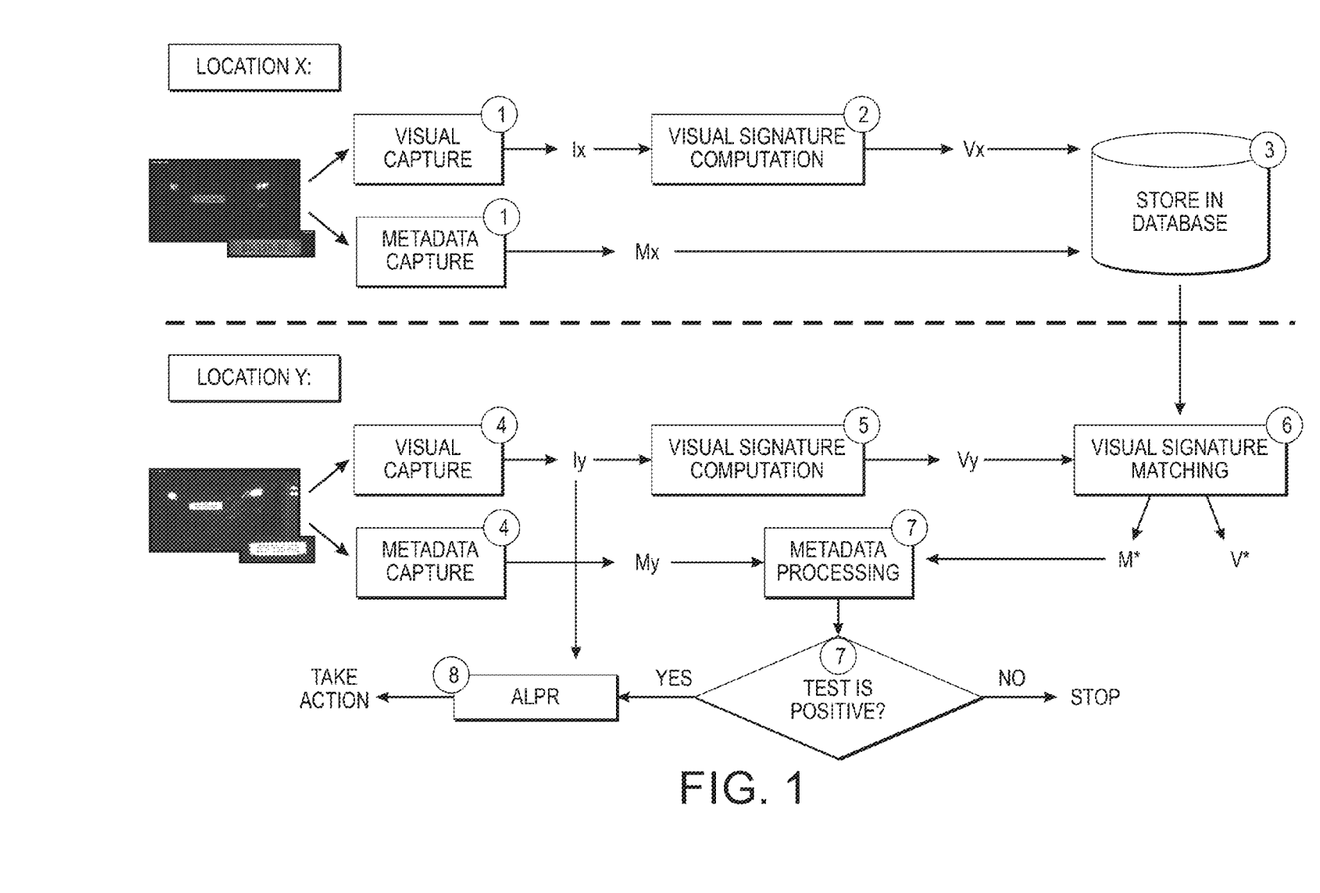
FIG. 1 is an overview of the exemplary system and method.

With reference to FIG. 1, an overview of an exemplary system and method for privacy-preserving delayed recognition of an object identifier is shown. In the exemplary embodiment, the object is a vehicle, such as a motorized vehicle, and its identifier is or includes the license plate number of the vehicle. However, it is to be appreciated that other moving objects and their identifiers are also contemplated, such as people and their respective fingerprints and/or eye scans, shipping parcels and their tracking or address information, and the like. FIG. 1 includes the numbers 1 to 8 which illustrate the order in which steps of the exemplary method may be performed, although these are not intended to be limiting.

Vehicle identification may be desired at multiple locations and/or at different times, for example at the entry and exit of a car park or at different points on a road. For the sake of simplification, two locations X and Y which are spaced from each other by a distance Z are considered, although it is to be appreciated that X and Y may be at or close to the same location.

In one embodiment, the aim is to find correspondences between the vehicle identities at X and Y, and when a correspondence between two identities has been established, to determine whether a certain condition is met that depends on information captured at X and Y. Only if the condition is met, a specified action is triggered, such as license plate recognition.

For example, in a speed enforcement application, if a correspondence between vehicle identities at X and Y is established from images captured at X and Y, the information associated with the captured images may include timestamps $(T_X, T_Y)$ at which the vehicle was present at X and Y and respective geographical locations $(L_X, L_Y)$, e.g., geographical coordinates of X and Y. The condition checked may be whether the identified vehicle's speed exceeds a threshold. The speed may be the average speed, computed as the distance Z between $L_Y$ and $L_Y$ divided by the time difference $T_Y-T_X$. If the condition is met, e.g., the speed exceeds a predefined threshold, the identifier is recognized from the captured image of the vehicle, at point Y, for example. A further action triggered may be to implement a process, such as generating an alert that the identified vehicle incurred a speed violation and launching an appropriate corresponding process, such as issuance of a speeding ticket.

In standard approaches based on Automatic License Plate Recognition (ALPR), the identities of all vehicles whose images are captured are recognized. In contrast, the present system and method provides for recognizing the identity only of violating vehicles, e.g., for billing purposes. Since it is unnecessary to recognize the identity of non-violating vehicles, the present system and method respects the anonymity of the vast majority of the vehicles (the non-violating ones) and identifies vehicles only when necessary.

In the exemplary embodiment, the recognition processing of a moving object, such as a vehicle, is split into two distinct operations:

1. Vehicle matching between points X and Y, which does not rely on recognition of the identifier (e.g., through ALPR).

2. Recognition of the identity of a vehicle, whether at X, at Y or at both locations, e.g., relying on ALPR.

It has been found that operation 1) performed without license plate recognition can be quite satisfactory for vehicle matching. For example, as demonstrated in the example below, it can be more accurate than identifying the vehicle at the two points with ALPR and then checking for exact matches of the license plate number.

In an exemplary embodiment, the vehicle matching is performed by signature matching. A signature is a set of values that represents the vehicle, or a part thereof. The signatures of two occurrences of the same vehicle should be more similar than the signatures of two different vehicles. Two vehicles are considered to have the same identity if the similarity between signatures exceeds a predefined threshold.

The exemplary signature may be derived from a set of visual features computed from the license plate region of the image, for example a Fisher Vector. In this case, similarity between signatures can be computed by a vector-to-vector similarity. Other visual cues may be used to complement the visual features, such as the vehicle make and/or model or distinctive features of the vehicle, such as the presence of a scratch (shape of the scratch, location, etc.). The availability of these cues may depend, in part, on how much of the car is visible in the captured images.

One advantage of using visual signatures is that a determination can be made as to whether two signatures correspond to the same vehicle (or not), without explicitly attempting to identify the vehicle. As an example, for each vehicle driving through a point Y, an attempt can be made to find a match between its signature computed at point Y and a signature at point X. When a match is found, the associated data (such as timestamps) is extracted and used to check the appropriate condition. Throughout this processing, the vehicle remains anonymous to the system. Only if the condition is met, an ALPR identification of the vehicle is requested and the corresponding action is triggered.

In addition to the privacy-preserving aspect, in terms of accuracy, it has been found that direct signature matching tends to be more robust than matching two ALPR outputs.

Figure 2:
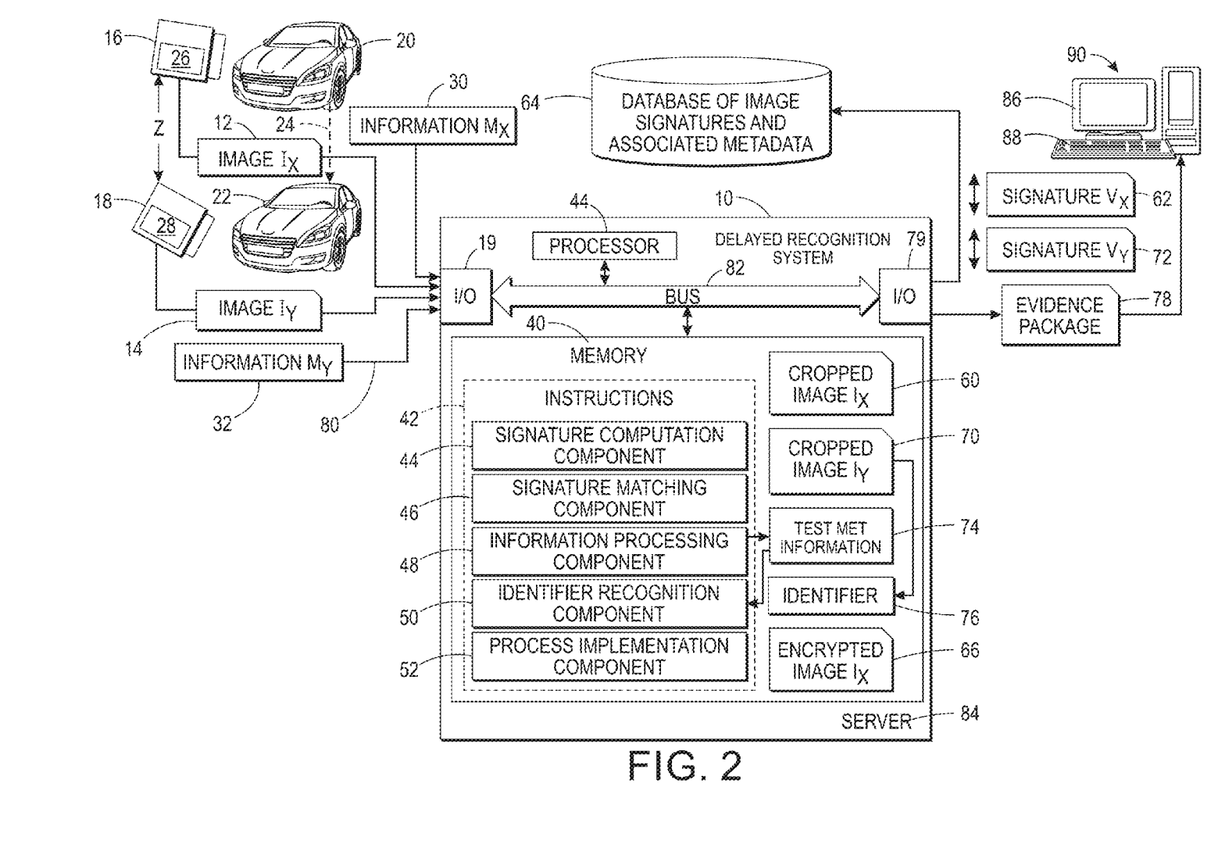
FIG. 2 is a functional block diagram of an environment in which a system for delayed recognition of an object identifier operates in accordance with one exemplary embodiment.

FIG. 2 illustrates an exemplary system 10 for delayed recognition of an object identifier in an operating environment which may operate substantially as shown in FIG. 1. In the illustrations, the identifiers of vehicles have been anonymized.

The system 10 receives, as inputs, sets 12, 14 of images $I_X$, $I_Y$ captured at locations X and Y by image capture devices 16, 18, such as cameras, positioned at these locations, e.g., via a network interface 19. Image capture devices 16, 18, may be configured to capture automatically an image of each vehicle as it passes the respective location, or only some of the vehicles, depending on the application. Each captured image $I_X$, $I_Y$ includes at least a portion of a vehicle 20, 22 which is capable of moving between the two locations X,Y, e.g., along a predefined path 24, such as a road, bus route, car park lane, or the like between the two locations. Each image capture device 16, 18, or a separate information capture component 26, 28, captures information 30, 32 associated with the capture of each image, e.g., in the form of image metadata $M_X$, $M_Y$, such as a respective timestamp and/or other types of information available. In the exemplary embodiment, location X is upstream on the path from location Y, such that for a given vehicle, image $I_X$ and its associated metadata $M_X$ is captured earlier in time than image $I_Y$ and its associated metadata $M_Y$.

The system includes memory 40 which stores instructions 42 for processing the images 12, 14 and associated metadata 30, 32. A processor 44, in communication with the memory 40, executes the instructions 42. The illustrated instructions 40 include a signature computation component 44, a signature matching component 46, an information processing component 48, an identifier recognition component 50 and a process implementation component 52.

Figure 3:
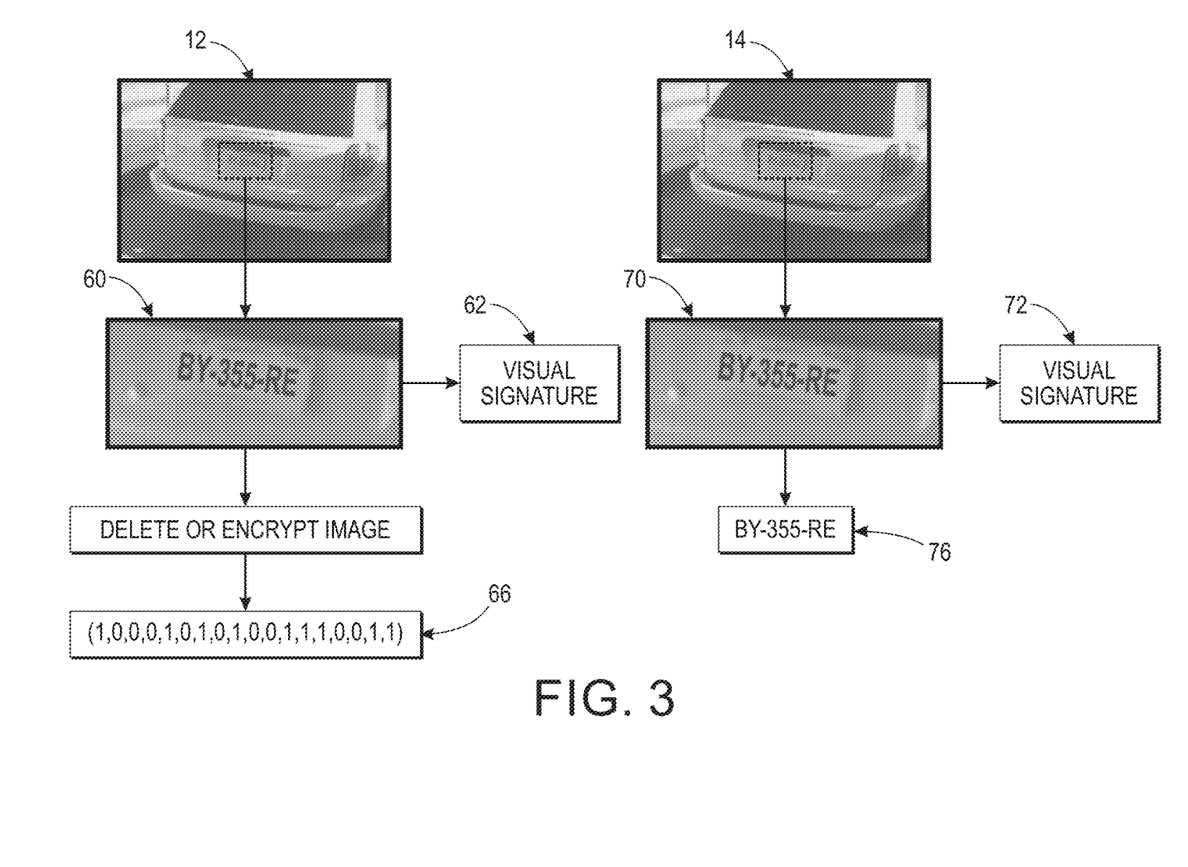
FIG. 3 graphically illustrates computing of visual signatures in a method for delayed recognition of an object identifier in accordance with another exemplary embodiment.

Briefly, the signature computation component 44 receives as input an image $I_X$ of each vehicle 20, 22 captured at location X and extracts a visual signature $V_X$ 62 from each image $I_X$. If the image 12 received is of a substantial portion of the vehicle, e.g., as illustrated in FIG. 3, the signature computation component 44 may include a cropping component which automatically extracts a cropped image 60 from the received image 12, which is predicted to include an object of interest (e.g., the area including the license plate number). The signature computation component 44 then computes the visual signature, e.g., based solely on the pixels of the cropped region, and stores the computed visual signature $V_X$ in a database 64. After computing the signature $V_X$, the original image 12 and cropped image 60 are not retained and may be deleted from memory or may be stored in an encrypted form as an encrypted image 66.

As will be appreciated, some preprocessing of the captured image 12, 60 may be performed at any time before and/or during the computing of the visual signature, such as scaling, skew removal, reducing the pixel resolution, image enhancement techniques, conversion from color to monochrome, and the like.

The signature computation component 44, or a separate signature computation component, similarly extracts a visual signature $V_Y$ from image $I_Y$, for example, by generating a cropped image 70 and extracting a visual signature 72 therefrom, which may be stored in the database 64, a separate database, or in temporary memory of the system.

The signature matching component 46 accesses the database 64 with each new visual signature $V_Y$ to identify one or more matching signatures from the visual signatures $V_X$ computed for vehicles whose images were previously captured at location X. The signature matching component retrieves the visual signature $V_X$ that is the closest match (referred to as V*), together with its associated meta-data $M_X$ (referred to as M*).

The information processing component 48 performs a test to determine whether a condition is met, which is a function of $M_Y$ and M*. For example, component 48 computes an average speed based on the time difference between M* and $M_Y$. Only if the test is satisfied, e.g., if the result of the test is positive, does the information processing component 48 output information 74 which confirms that the test has been met, which may include a call to the identifier recognition component 52. If the test is not met, the identifier recognition component does not receive a call to perform identifier recognition.

The identifier recognition component 52 (assuming the test is met) performs character recognition (ALPR) on the image $I_Y$ 70 to generate a character sequence 76 corresponding to the recognized identifier of the vehicle, such as the license plate number. The process implementation component 52 may thereafter take an appropriate action, e.g., output an evidence package 78 which may include one or more of: the output of the signature matching component (e.g., an identifier which allows the original image $I_X$, to be retrieved, if required), the output 74 of the information processing component, and the output 76 of the identifier recognition component. The package 78 may be output from the system 10 via a network interface 79 and/or stored in memory 40 for further processing. This may include, for example, the automated generation of a notice that a violation has taken place, such as a speeding ticket, unpaid vehicle toll, parking ticket, or the like, depending on the application.

The system 10 may communicate with external devices, such as image capture devices 16, 18, via wired or wireless connections 80 such as a telephone line, local area network, or a wide area network, such as the Internet. In some embodiments, data 12, 30, 14, 32 from the image capture devices is routed to the system 10 via an intermediate server. Hardware components 19, 40, 44, 79 of the system may communicate via a data/control bus 82.

The system 10 may be resident on one or more computing devices 84, such as a PC, such as a desktop, a laptop, palmtop computer, portable digital assistant (PDA), server computer, cellular telephone, tablet computer, pager, combination thereof, or other computing device capable of executing instructions for performing the exemplary method. As will be appreciated parts of the system 10 may be distributed over two or more computing devices. For example, image signatures for images 12 may be computed by a separate computing device from device 84, and stored in database 64 accessible to the computing device 84.

The system 10 may communicate, via input/output interface 79, with one or more of a display device 86, such as an LCD screen or computer monitor, for displaying information to users, and a user input device 88, such as a keyboard or touch or writable screen, and/or a cursor control device, such as mouse, trackball, or the like, for inputting text and for communicating user input information and command selections to the processor 44. The display device and user input device are illustrated as being part of a client computing device 90, although in other embodiments, they may be directly linked to the computer 84.

The memory 40 may represent any type of non-transitory computer readable medium such as random access memory (RAM), read only memory (ROM), magnetic disk or tape, optical disk, flash memory, or holographic memory. In one embodiment, the memory 40 comprises a combination of random access memory and read only memory. In some embodiments, the processor 44 and memory 40 may be combined in a single chip.

The network interface 19, 78 allows the computer to communicate with other devices via a computer network, such as a local area network (LAN) or wide area network (WAN), or the Internet, and may comprise a modulator/demodulator (MODEM) a router, a cable, and and/or Ethernet port.

The digital processor 44 can be variously embodied, such as by a single-core processor, a dual-core processor (or more generally by a multiple-core processor), a digital processor and cooperating math coprocessor, a digital controller, or the like. The digital processor 44, in addition to controlling the operation of the computer 84, executes instructions stored in memory 40 for performing the method outlined in FIG. 4.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 4:
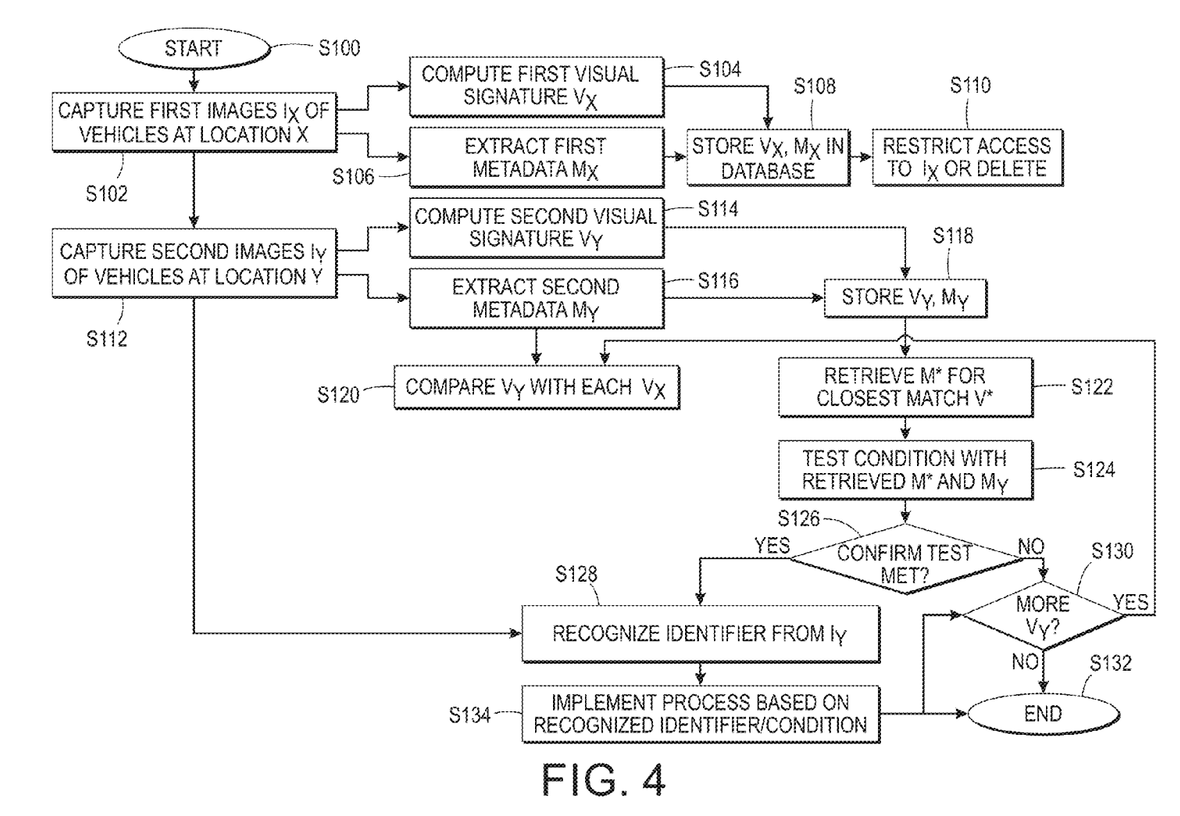
FIG. 4 is a flow chart illustrating a method for delayed recognition of an object identifier in accordance with another exemplary embodiment.

With reference to FIG. 4, a method for delayed recognition of an identifier which may be performed with the system of FIG. 2 is shown. The method begins at S100.

At S102, a first image $I_X$ of each vehicle captured at location X is received.

At S104, a visual signature $V_X$ is extracted from first image $I_X$, by the signature computation component 44.

At S106, metadata $M_X$ associated with the captured first image is extracted, e.g., by the metadata extraction component 26 of the first image capture device 16 and/or by the information processing component 48.

At S108, the visual signature $V_X$ and the associated metadata $M_X$ for each first image are stored in database 64, which is used to collect such data for many vehicles passing through location X. Each visual signature $V_X$ is linked to the respective information $M_X$ so that the information $M_X$ can later be retrieved based on the visual signature $V_X$, e.g., through an index which links the two.

Each of a set of visual signatures $V_X$ may then be considered as a candidate match for a later-acquired image $I_Y$. In some embodiments, the database 64 may be pruned periodically, for example, to remove visual signatures $V_X$ and associated information $M_X$ that have been stored for longer than a predetermined period, or when it is unlikely to be relevant. For example, the database may be pruned hourly or daily in the case of an application which is designed to check speed, as even if a vehicle image is subsequently matched, a threshold time delay would be too large for the speed condition to be met.

At S110, access to the original (and cropped) image $I_X$ may be restricted or denied, for example, by deleting or encrypting image $I_X$.

At S112, a second image $I_Y$ of each vehicle captured at location Y is received.

At S114, a visual signature $V_Y$ is extracted from second image $I_Y$.

At S116, metadata My associated with the captured end image is extracted.

At S118, the visual signature $V_Y$ and the associated metadata $M_Y$ are stored, e.g., in database 64 and/or in temporary memory of the system 10. Each visual signature $V_Y$ is linked to the respective information $M_Y$.

At S120, for each visual signature $V_Y$, a search is made in the database 64 for similar visual signatures $V_X$ and the closest match V* is identified. In some cases, a threshold similarity may be established, and image signatures which do not at least meet the threshold similarity are not considered as a match.

At S122, the metadata M* for the matching signature(s) V* is/are retrieved. At S124 a test is performed which includes a condition based on $M_Y$ and M*, to determine whether the test is met.

At S126, if is confirmed that the test is met (if and only if the test is satisfied), then the method continues to S128, where the identifier for the vehicle is recognized, for example, by performing ALPR on $I_Y$ (and/or $I_X$). Otherwise, the method proceeds to S130, where if there are more image signatures $V_Y$ to be tested, the method returns to S120, otherwise the method ends at S132.

The method may proceed from S128 to S134, where information 78 based on the recognized identifier is output and/or used in a further computer-implemented process. The method may then proceed to S130 or S132.

The method illustrated in FIG. 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 84, (for example, an internal hard drive of RAM), or may be separate (for example, an external hard drive operatively connected with the computer 84), or may be separate and accessed via a digital data network such as a local area network (LAN) or the Internet (for example, as a redundant array of inexpensive of independent disks (RAID) or other network server storage that is indirectly accessed by the computer 84, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4, can be used to implement the method for delayed identifier recognition. As will be appreciated, while the steps of the method may all be computer implemented, in some embodiments one or more of the steps may be at least partially performed manually.

Further details of the system and method will now be described.

Image and Metadata Capture (S102, S112, S106, S116)

Captured images 12, 14 ($I_X$ and $I_Y$) may be received by the system 10 in any convenient file format, such as JPEG, GIF, JBIG, BMP, TIFF, or the like or other common file format used for images and which may optionally be converted to another suitable format prior to processing. The input images may be stored in data memory during processing. The images may be individual images, such as photographs, or images extracted from sequences of images, such as video images. In general, each input digital image includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single color channel, however expressed (L*a*b*, RGB, YCbCr, etc.). The method is also suitable for black and white (monochrome) images. The word "color" is used to refer to any aspect of color which may be specified, including, but not limited to, absolute color values, such as hue, chroma, and lightness, and relative color values, such as differences in hue, chroma, and lightness. In some embodiments, color can refer to a non-visible region of the electromagnetic spectrum, such as the Near Infrared (NIR) region, which is from about 800 nm to 2500 nm.

The image capture at a given location X, Y may be triggered in any suitable manner. In one embodiment, a loop sensor may be locally positioned, e.g., in the ground, which detects the presence of a vehicle and triggers a shot (and possibly a flash). In one embodiment, the camera 16, 18 shoots a video comprising a sequence of images and a motion detection algorithm or an object detection algorithm (or the combination of both) is employed which detects the presence of a vehicle in the image sequence and selects one image from the sequence accordingly. Vehicle detection techniques are well known and disclosed for example, in U.S. Pat. Nos. 4,433,325, 5,083,200, 5,592,567, 5,809,161, 5,995,900, 6,996,255, and U.S. application Ser. Nos. 13/836,310, and 13/973,330, the disclosures of all of which are incorporated herein in their entireties by reference. The image can be captured in full color, monochrome, NIR (near infrared), or a combination thereof.

In some embodiments, the same image capture device could be used for capturing both images $I_X$ and $I_Y$, such as in a car park.

The associated metadata 30, 32 may each include sufficient information to enable a determination to be made as to whether a predetermined condition has been met. One or more different types of information may be acquired, such as one or more of time stamp, current speed of the vehicle, GPS location, payment information, weather information, and the like.

Visual Signature Computation (S104, S114)

In the exemplary embodiment, the visual signature 62, 72 contains enough information to identify a vehicle (or part of a vehicle) uniquely but should also robust enough to accommodate variations in viewpoint or lighting conditions. It is also constructed in such a way that, given a visual signature, neither the original image nor the identifier can be reconstructed from it.

In the exemplary embodiment, the visual signature 62, 72 is extracted from a region of the image which is predicted to contain the identifier such as a region which encompasses the license plate or at least that part of it which includes the license plate number. To identify this region, a detection algorithm that extracts the corresponding part of the image can be run. Methods for identifying the region of interest in the larger image are described, for example, in U.S. Pub. No. 20130182909 and application Ser. No. 13/592,961, incorporated herein by reference.

Once the region of interest has been identified and a cropped image 60, 70 generated which includes this region, the visual signature 62, 72 can be computed on the cropped region. In general, the visual signature is a statistical representation of the pixels of the cropped image. For example, a set of patches of the cropped image are extracted, e.g., densely, on a grid at one or at multiple scales. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire cropped image, or at least a part or a majority of the image. For example, at least 10 or at least 20 or at least 50 patches are extracted from each cropped image. Each patch may comprise at least 40 or at least 100 pixels, and up to 1,000,000 pixels or more.

For each patch, low-level features are extracted, such as shape, color and/or gradient (SIFT) features (see, D. Lowe, "Distinctive image features from scale-invariant keypoints", IJCV, 2004). A patch descriptor, such as a vector or histogram, which is a representation of the extracted low level features for a patch, is generated. Based on the descriptors of all the patches, on overall visual signature of the image is generated. In particular, statistics are computed on these patch descriptors and then the statistics are aggregated.

Each visual signature is a fixed-length vectorial representation of the (cropped) image in a D-dimensional space. In one embodiment, the visual signature is based on the Fisher Vector (FV). See, for example, Perronnin and Dance, "Fisher kernels on visual vocabularies for image categorization," CVPR, 2007; Perronnin, Sanchez and Mensink, "Improving the Fisher kernel for large-scale image classification", ECCV, 143-156 (2010); Sanchez and Perronnin, "High-dimensional signature compression for large-scale image classification," in CVPR 2011; U.S. Pub. No. 20120076401, published Mar. 29 2012, entitled IMAGE CLASSIFICATION EMPLOYING IMAGE VECTORS COMPRESSED USING VECTOR QUANTIZATION, by Jorge Sanchez, et al.; and U.S. Pub. No. 20120045134, published Feb. 23, 2012, entitled LARGE SCALE IMAGE CLASSIFICATION, by Florent Perronnin, et al. the disclosures of which are incorporated herein by reference in their entireties. The trained GMM is intended to describe the content of any image within a range of interest (for example, any license plate image if the range of interest is license plates). A Fisher Kernel representation can be generated by aggregation of the Fisher vectors. Other image representations may be used such as the bag-of-visual-words of Csurka et al., Visual Categorization with Bags of Keypoints, ECCV Workshop, 2004.

Fisher Vectors show robustness in the range of photometric and geometric variability found in license plate processing. Briefly, Fisher vectors work by aggregating local patch descriptors into a fixed-length representation. First, SIFT descriptors are extracted from patches extracted at multiple scales on a regular grid, and their dimensionality is optionally reduced using principal component analysis (PCA). A visual vocabulary is built by estimating a Gaussian mixture model (GMM) with patch descriptors extracted from a held-out set of images. In other approaches, the local descriptors of the patches of an image are assigned to clusters. For example, a visual vocabulary is previously obtained by clustering local descriptors extracted from training images, using for instance K-means clustering analysis. Each patch vector is then assigned to a nearest cluster and a histogram of the assignments can be generated. In other approaches, a probabilistic framework is employed, as in the case of the Fisher vector described above. For example, it is assumed that there exists an underlying generative model, such as a Gaussian Mixture Model (GMM), from which all the local descriptors are emitted. Each patch can thus be characterized by a vector of weights, one weight for each of a set of (e.g., at least 5 or 10) Gaussian functions forming the mixture model. In this case, the visual vocabulary can be estimated using the Expectation-Maximization (EM) algorithm. In either case, each visual word in the vocabulary corresponds to a grouping of typical low-level features. The visual words may each correspond (approximately) to a mid-level image feature such as a type of visual (rather than digital) object (e.g., features of characters, such as straight lines, curved lines, etc.), characteristic background (e.g., light or dark surface, etc.), or the like. Given an image to be assigned a visual signature, each extracted local descriptor is assigned to its closest visual word in the previously trained vocabulary or to all visual words in a probabilistic manner in the case of a stochastic model. A histogram is computed by accumulating the occurrences of each visual word. The histogram can serve as the visual signature or input to a generative model which outputs a visual signature based thereon.

The Fisher vector is computed as the derivative of the log-likelihood with respect to the GMM parameters. For example, if only the means are considered, it can be shown that the expression is given by:

$$f_{id} = \gamma(x_t)\left[\frac{x_{t,d} - m_{i,d}}{(S_{i,d})^2}\right]$$

where $\gamma(x_t)$ is the soft-assignment probability of the tth patch to the ith Gaussian, $x_{t,d}$ is the dth component of the ith patch, and $m_{i,d}$ and $S_{i,d}$ are the dth components of the mean and standard deviations of the ith Gaussian, assuming diagonal covariances. Here, i=1 K and d=1 . . . D. If only the derivatives with respect to the mean are used, then the resulting Fisher vector is a concatenation of the K×D elements $f_{id}$. Square-rooting and $l_2$-normalization of the vector may be used.

To include spatial information about the cropped image, the image can be partitioned into regions, such as at least three regions, the per-patch statistics aggregated at a region level, and then the region-level representations concatenated to form the image representation. See, for example, S. Lazebnik, et al., "Beyond bags of features: Spatial pyramid matching for recognizing natural scene categories," CVPR '06 Proc. 2006 IEEE Computer Society Conf. on Computer Vision and Pattern Recognition—Volume 2, Pages 2169-2178.

The exemplary visual signatures are of a fixed dimensionality D, i.e., each image representation has the same number of elements. In general, each image representation has at least 30, or at least 60, or at least 100, or at least 500 dimensions, and up to 1000 or more dimensions, each dimension having a respective feature value, which may be reduced to fewer dimensions.

As an example, the low-level features include gradient features, such as SIFT descriptors, one per patch. See, e.g., Lowe, "Distinctive image features from scale-invariant keypoints," IJCV vol. 60 (2004). In one illustrative example employing SIFT features, the features are extracted from 32×32 pixel patches on regular grids (every 16 pixels) at five scales. The dimensionality of these descriptors can be reduced from 128 to 32 dimensions. Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used. In the examples below, a visual vocabulary of 64 Gaussians is used in the GMM and only the gradient with respect to the mean parameters is considered. The cropped image is split into 4 regions (4 vertical stripes). This results in a 32×64×4=8,192-dimensional FV representation. The representations may be indexed or compressed using conventional techniques (locality sensitive hashing (LSH), product quantization, principal component analysis (PCA), etc.) to speed up the process.

The visual signature is one which does not allow recognition from the identifier from it. A visual signature such as the FV fulfills the desired property that the original image cannot be reconstructed for it, and therefore can be seen as a hash key of the original image as there is no feasible way to recover the original image (or the license plate number) from the visual signature. This is because the identity of the individual patches is lost in the aggregation process. Consequently, this reduces the privacy concern as the service operator does not have access to the identities of all vehicles, only a very small portion of the vehicles that cause the actions to be triggered (e.g., vehicles driving above speed limit). Like hashing functions used for storing passwords, the only method to recover the original image is to try to perform a brute-force match with all possible images.

Other exemplary methods for computing image representations are disclosed for example, in the following references, the disclosures of all of which are incorporated herein in their entireties, by reference: US Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831; 20110040711; 20110052063; 20110072012; 20110091105; 20110137898; 20110184950; 20120045134; 20120076401; 20120143853, and 20120158739.

Storage (S108)

The signature/metadata pair ($V_X$, $M_X$) is stored in the database 64 linked together so that the signature matching component 46 can return the associated metadata whenever it finds a match between a signature $V_X$ and the visual signature $V_Y$ of a new image $I_Y$.

Restriction of Access (S110)

The controls on access to original image $I_X$ and/or $I_Y$ may depend on the application and/or on local privacy laws which restrict the use of personal information. In some applications, the original image may be retained in case it is needed for visual proof that the signature matching was correct. However, it may be encrypted with an encryption method, e.g., a public/private key method, which allows only authorized users to decrypt the encrypted images when permitted to do so, e.g., when authorized by the vehicle owner or a law enforcement body or tribunal. In other embodiments, the original images $I_X$ and all copies/cropped versions thereof may be deleted from computer memory as soon as the image signature has been computed. Precautions may be to prevent human access to the captured images in the period between image capture and signature computation. In some embodiments, the image signature computation may be performed by software components within the image capture devices 16, 18 to avoid the images themselves being intercepted.

Where the image $I_X$ is to be deleted or encrypted, this may take place prior to at least one of steps S106 to S128 (if the test is met) or S130, if not met. In one embodiment, S110 may take place prior to S112.

Visual Search (S120)

Given a query visual signature $V_Y$, the database 64 is searched for its closest match(es). The measure of similarity which is used may depend on the type of visual signature employed. The cosine distance has been shown to be an appropriate measure of similarity for the FV. However, other similarity measures are also contemplated, such as the Euclidian distance and the Manhattan distance. The Euclidian distance, dot product, the $chi^2$ distance, Kullback-Leibler (KL) divergence, Jensen-Shannon divergence, and the like may be used in computing similarity for other types of visual signature, for example in the bag-of visual words method.

When the number of visual signatures $V_X$ stored in the database 64 is small enough (e.g., on the order of several thousand visual signatures), then the search for a closest match V* can be done in an exhaustive manner, i.e., by comparing the visual query with all database entries. When the database 64 contains a larger number of images, an exhaustive search may be time consuming. In this case, an approximate search technique may be employed. Techniques for the approximate search of high-dimensional vectors are disclosed, for example, in Jégou, et al., "Aggregating local image descriptors into compact codes," IEEE TPAMI, 34(9) 1704-1716 (2012).

Since the Fisher vector is an explicit embedding of the Fisher kernel, the corresponding cosine similarity measure between two such image descriptors $V_X$ and $V_Y$ is the dot product $V_X^T V_Y$. A candidate plate is compared against all images in a database and the identity of the closest match is assigned, provided the similarity is sufficiently high.

In one embodiment, the visual signature (e.g., the FV) can be made more discriminative by applying a projection which is obtained, for instance, by learning a metric for embedding the visual signature into a vectorial space where similarity is a good indicator for actual similarity (in terms of the character sequences forming the identifiers). As an example, a low-rank Mahalanobis metric can be employed, see for example, Rodriguez-Serrano, et al., "Data-Driven Vehicle Identification by Image Matching". $12^{th}$ European Conf. on Computer Vision (ECCV) Workshops, Oct. 7-13, 2012, Lecture Notes in Computer Science, vol. 7584, pp. 536-545. See also U.S. application Ser. Nos. 13/592,961, 13/757,014, and 13/903,218, the disclosures of which are incorporated by reference, for descriptions of exemplary embedding techniques. The FV has been shown experimentally to be particularly appropriate for matching of license plate images, especially in combination with learned projections. The Fisher Vector is also shown below to be superior to the standard license plate matching approach which involves in performing ALPR and then comparing the sequences.

Metadata Processing (S124)

The information processing component 48 may compute various metrics based on the metadata collected at two (or more) locations. For example, the timestamps and GPS coordinates may be used to infer an average speed. This may be compared with a threshold speed, e.g., a maximum speed limit, to determine whether the speed limit is exceeded. In the case of information relating to weather conditions (e.g., a detected rainfall or visibility), this may be used to determine whether the average speed of the vehicle exceeded a weather-related speed limit, which may be lower than the normal posted speed limit.

In some applications images captured at "entries" are associated to "tickets". Thus the metadata can include a ticket ID, ticket status (paid, non-paid), paid amount, authorized time (e.g., based on the paid amount), and so forth. For example, if a ticket was paid for authorizing the user to park for a time of 2 hours, but the user parked for 4 hours, an unpaid amount may be computed optionally with a penalty. In this case, the test condition applied at S124 may define a relationship between the computed time and the authorized time, for example, to allow for some leeway. For example, the condition may specify that the test is met if the computed time exceeds the authorized time by at least a predetermined amount, such as 5, 10 or 15 minutes, or a percentage of the authorized time.

As will be appreciated, the test may include more than one condition and a given test may require that one or more (or all) of the conditions be satisfied for the test to be met. In some cases, conditions may be evaluated in the alternative. For example, one condition may specify: if condition 1 is satisfied, test condition 2, otherwise test condition 3. Different conditions may rely on the same or different parts of the metadata. For example, one condition could relate to the weather or time of day/day of the week, and another condition to the computed speed of the vehicle, length of stay in the car park, and so forth.

ALPR (S128)

Only if the test performed on the metadata at S124 is positive (e.g., speed greater than a posted speed limit, a parking duration which does not correspond to a paid amount, exiting a car park without paying ticket), then identifier recognition, e.g., ALPR is performed. The ALPR may be performed on image $I_Y$ before or after cropping or other processing. For example, any suitable ALPR system may be used for recognizing the license plate number based in the cropped image 70. Where multiple images $I_Y$ are obtained at location Y, as in a video sequence, these are considered to be the same as image $I_Y$.

In the case of license plate number recognition, the identifier (sometimes referred to as a registration identifier) includes a sequence of characters drawn from a predefined alphabet (a finite set of characters), such as letters and numbers. The license plate number may be a numeric or alphanumeric code that uniquely identifies the vehicle on which it is mounted within the issuing region's database.

The license plate recognition component 50 may use optical character recognition (OCR) alone or in combination with other techniques, to identify a sequence of characters drawn from the finite alphabet that is predicted to correspond to the characters in the cropped image 70. Spaces and characters other than those in the finite alphabet may be ignored. In some embodiments, the recognition component 50 may extract additional textual information, such as the state of issuance. Logos may also be recognized from a stored logo database.

As will be appreciated, the license plate number and image of a license plate are exemplary only and are used to illustrate the exemplary embodiment. In other embodiments, a larger set of ASCII, UNICODE, and/or UTF-8 characters may be used as the alphabet.

License plate recognition methods which may be used are disclosed, for example, in above-mentioned U.S. Pub. Nos. 20130129151, 20130129152, 20130182909, and 20130259314, and U.S. application Ser. Nos. 13/592,961, 13/757,014, 13/836,310, and 13/903,218, and in J-A. Rodriguez-Serrano, H Sandhawalia, R. Bala, F. Perronnin and C. Saunders, "Data-Driven Vehicle Identification by Image Matching". $12^{th}$ European Conf. on Computer Vision (ECCV) Workshops, Oct. 7-13, 2012, Lecture Notes in Computer Science, vol. 7584, pp. 536-545. In one embodiment, Xerox License Plate Recognition (XLPR) software is employed.

Action (S134)

The action initiated by the process implementation component 52 may depend on the type of application. In the case of license plates, the action triggered is associated to the respective license plate number identified at S128 (e.g., prosecute the violator, alert parking operator, send parking fine, etc.).

Accounting for Imperfect Matching

In some embodiments, it is reasonable to assume that the visual signature matching component 46 delivers 100% accuracy. In such a case, the following operations may be performed:

1. At location X, all the images captured at location X can be discarded after signature computation.

2. At location Y, all the images and signatures of non-violating vehicles can be discarded after S126.

However, a 100% accuracy is not always possible in practice. For example, the following sources of failure may be found. First, the visual signature matching component 46 sometimes does not return any result at S122, for example, because the confidence in the closest match is too low. In such a case, steps S124 and S126, etc., are simply not performed. This also means that the corresponding signature which should have been retrieved as V* remains in the database, possibly indefinitely. To avoid the database becoming populated with signatures which may never be needed again, the database may be regularly purged to remove its oldest entries, for example, when they have been in the system for more than a predetermined amount of time. In the case where the condition tested at S124 cannot be met after a predetermined amount of time (for example, the computed speed can no longer exceed the speed limit) the signatures $V_X$ which cannot meet the specified condition can be purged.

A second source of failure is a false positive, where the signature matching component 46 may return an incorrect result with a confidence which is higher than a predetermined confidence threshold. This may lead to a vehicle owner erroneously receiving a parking/speeding ticket or other action being taken. In such a case, it may be desirable to ensure that a human operator can correct such an error, when the error becomes known. For example, a procedure may be established for the driver of the vehicle, service provider, or law enforcement to challenge the system. To assist in verifying that a failure has occurred, the image $I_X$ may be stored in the database (e.g., in an encrypted format) and both $I_X$ and $I_Y$ may be included in the evidence package output at S134. While the images may be stored in an unencrypted format, there remains a risk that an unauthorized person may gain access to the identity of the users who have been through X but not yet through Y by visually inspecting the images in the database. To address this issue, the images may be stored in an encrypted format, e.g., by encrypting each image (and/or cropped image) with a public key. Only the persons who are authorized to access the evidence package 78 (e.g., officers of the law) may have access to the private key needed to decrypt the images.

Uses of the Exemplary System

Examples of where the exemplary system and method may find application include:

1. Point-to-point enforcement, for example speed enforcement on a medium-/long-range.

2. Monitoring entries and exits of car parks. When a vehicle exits the car park, the signature matching component 46 associates its visual signature with the entry transaction. Assuming a ticket is delivered to the customer at the entry, the metadata can include the timestamp, the ticket number, and payment status for that ticket. At the exit, the metadata processing at S124 checks that the ticket has been paid and that the paid amount corresponds to the correct duration. It is also possible to ascertain if the ticket is associated with the same car at entry and exit to avoid ticket swapping. In car parks with barriers, that could trigger an alert to an operator to go and resolve the issue. In car parks without barriers, a fine could be sent to a customer.

3. Automatic tolling: this may include associating the vehicle ID with the bank account/credit card of subscribed drivers for automatic payments.

4. Violation enforcement: this may include associate the violating vehicle ID with the identity of the vehicle owner for prosecution.

5. Car park management: this may include associating the vehicle ID with an issued parking ticket and open a barrier automatically at the car park exit; or associate the vehicle ID to a subscribed customer account and open all barriers automatically.

6. Vehicle flow analysis/data mining: This may include tracking re-occurring vehicle IDs to measure travel times, analyze patterns of behavior, and the like.

Without intending to limit the scope of the exemplary embodiment, the following example illustrates the application of the method to license plate recognition

EXAMPLE

Figure 5:
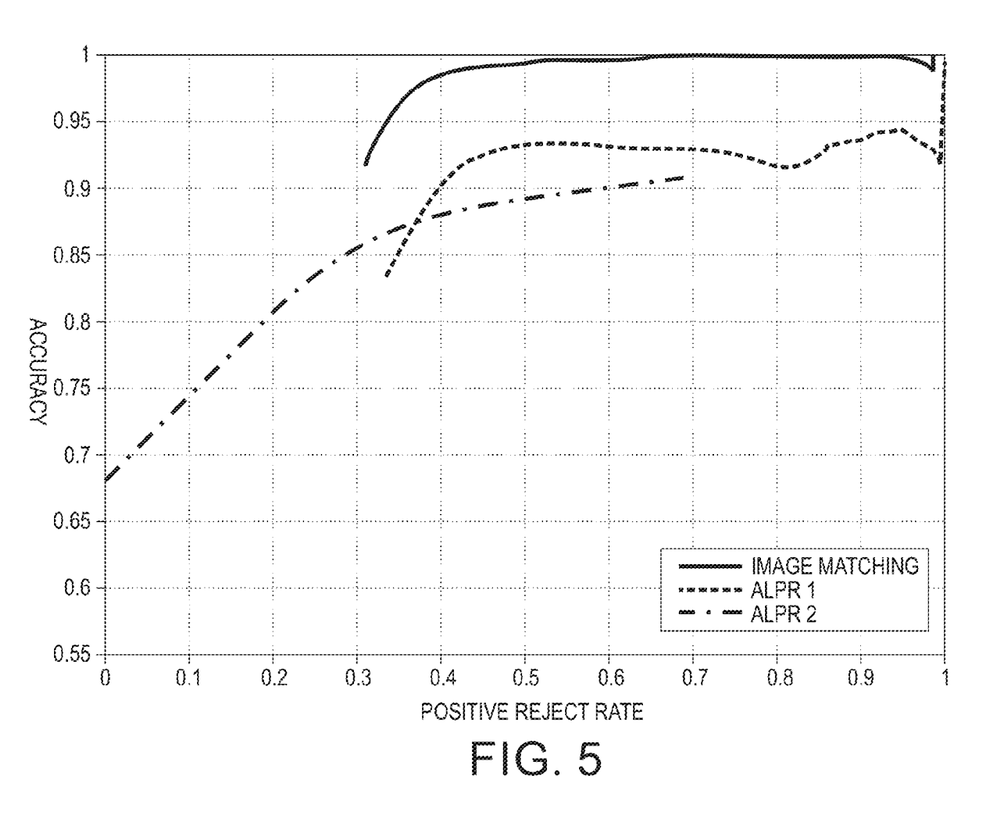
FIG. 5 is a plot showing accuracy of different vehicle identification methods in one example.

The accuracy of image matching (using the exemplary visual signatures using Fisher Vectors) was evaluated as a method for identifying the same vehicle at entry and exit locations of a car park. The number of correct entry-exit associations was counted. The plot shown in FIG. 5 compares the accuracy-reject characteristic of signature matching with two conventional ALPR systems (denoted ALPR 1 and ALPR 2). The visual signature matching method correctly associates about 96% of the entries and exits. In contrast, an OCR system which relies on exact matching of the sequence of characters identified in each image yields results with an accuracy below 90%. Although applying inexact OCR matching yields accuracies similar to the signature matching method, it is not possible to perform inexact matching if the license plate numbers are hashed.

Figure 6:
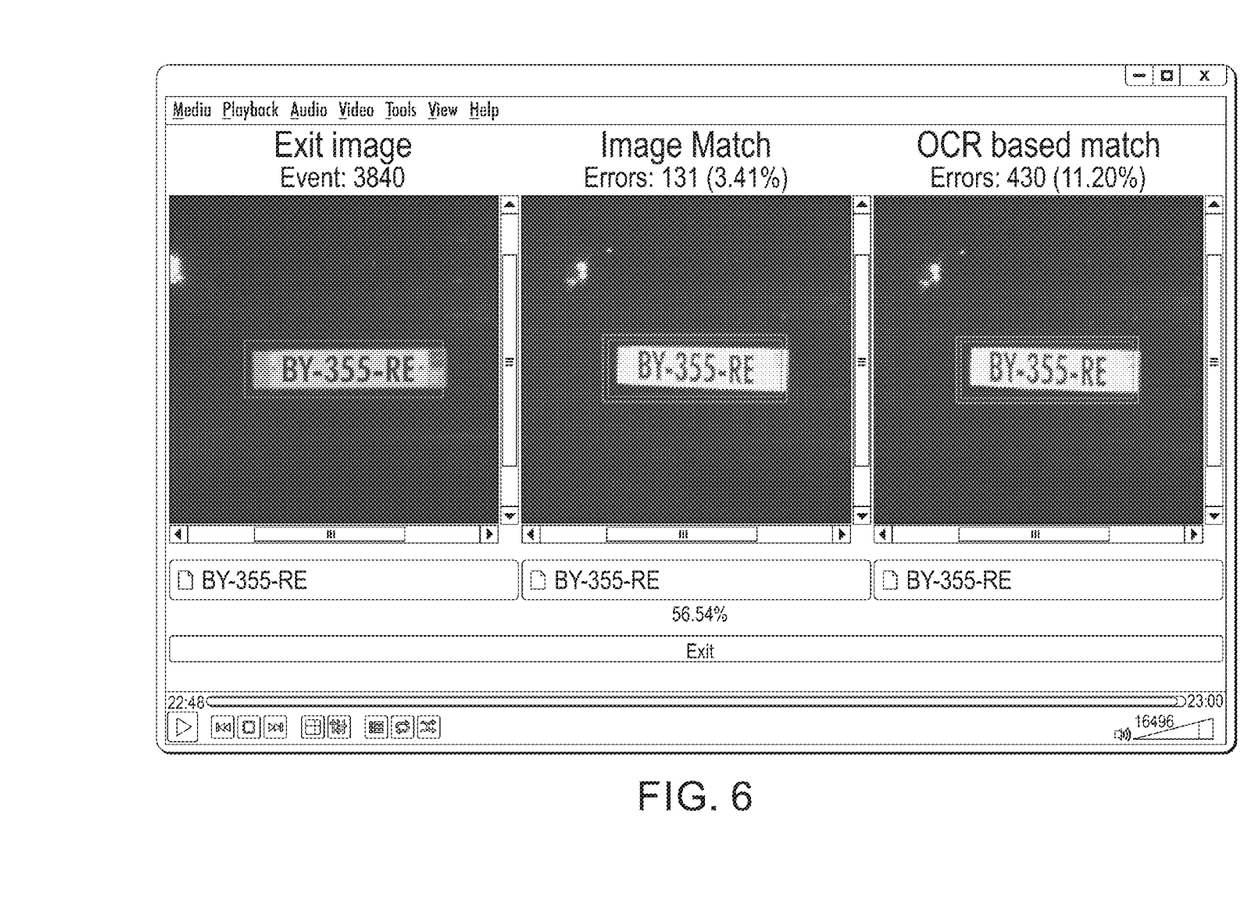
FIG. 6 is a screenshot illustrating errors in two different vehicle identification methods in the example.

FIG. 6 is a screenshot of a demonstration of data captured at a car park used in the evaluation. The screenshot displays an image captured at the exit of the car park and the associated entry image retrieved by signature matching and ALPR-based (OCR) matching. While both methods retrieved the same image in this case, on average, the ALPR system produced more errors (11.2%) than the present visual signature matching system (3.41%). Additionally, the present visual signature matching method could be optimized further to account for such factors as lighting.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for recognition of an identifier, comprising:
for each of a plurality of objects, storing a first visual signature, which has been extracted from at least a part of a respective first image of the object captured at a first location, the first visual signature comprising a multidimensional statistical representation of pixels of at least the part of the respective first image, and first information associated with the first captured image, the first information comprising a first time stamp;
computing a measure of similarity between a second visual signature and at least some of the first visual signatures to identify a matching one of the first visual signatures, based on the computed measure of similarity, the second visual signature having been extracted from at least a part of a second image of a second object captured at a second location, based on at least a part of the second image, the second visual signature comprising a multi-dimensional statistical representation of pixels of at least the part of the second image;
retrieving the stored first information associated with the matching one of the first visual signatures and stored second information associated with the second captured image, the second information comprises a second time stamp which is later in time than the first time stamp;
performing a test which is a function of the retrieved stored first time stamp and the stored second time stamp; and
recognizing an identifier of the second object based on a captured image of the second object, only when it is confirmed that the test has been met.

2. The method of claim 1, wherein at least one of the computing the measure of similarity, performing the test, and the recognizing of the identifier is performed with a computer processor.

3. The method of claim 1, further comprising:
for each of the plurality of objects:
receiving the first image of the object captured at the first location and the information associated with the first captured image,
extracting the first visual signature based on at least a part of the first image, and
storing the first visual signature and the information associated with the first image.

4. The method of claim 3, further comprising deleting or encrypting each first image after extracting the respective visual signature and at least prior to the recognizing of the identifier.

5. The method of claim 1, further comprising:
receiving the second image of the second object captured at the second location and the information associated with the second image;
extracting the second visual signature based on at least a part of the second image.

6. The method of claim 1, wherein each object comprises a vehicle and each identifier comprises a sequence of characters.

7. The method of claim 6, wherein the recognizing of the identifier comprises performing automated license plate recognition on the first or second image.

8. The method of claim 1, wherein the performing of the test comprises computing a speed based on the first and second time stamps and a distance between the first and second locations and comparing the computed speed to a threshold speed.

9. The method of claim 8, wherein the test is met when the computed speed exceeds the threshold speed.

10. The method of claim 1, wherein the performing of the test comprises comparing a difference between the first and second time stamps with an authorized time.

11. The method of claim 10, wherein the test is met when the difference between the first and second time stamps exceeds the authorized time by a predetermined amount.

12. The method of claim 1, further comprising implementing a process based on the recognized identifier.

13. The method of claim 1, wherein first visual signatures are stored in a database and the method further comprises purging first visual signatures from the database when the test can no longer be met.

14. The method of claim 1, wherein the second object is one of the plurality of objects.

15. The method of claim 1, wherein when the test has not been met no recognition of the identifier is performed.

16. A computer program product comprising a non-transitory recording medium storing instructions, which when executed on a computer causes the computer to perform the method of claim 1.

17. A system comprising memory which stores instructions for performing the method of claim 1, and a processor in communication with the memory which executes the instructions.

18. A system for recognition of an identifier, comprising:
memory which, for each of a plurality of vehicles, stores:
- a first visual signature, which has been extracted from at least a part of a first image of the respective vehicle captured at a first location, and first information associated with the first visual signature, the first information comprising at least one of a first time stamp, a current speed of the vehicle, GPS location, payment information, and weather information, and
- a second visual signature, which has been extracted from at least a part of a second image of the respective vehicle captured at a second location, and second information associated with the second visual signature, the second information comprising at least one of a second time stamp, a current speed of the vehicle, GPS location, payment information, and weather information;

a signature matching component for computing a measure of similarity between one of the second visual signatures and at least some of the first visual signatures to identify a matching one of the first visual signatures, based on the computed measure of similarity;

an information processing component which performs a test which is a function of the retrieved stored first information and the stored second information, the first information comprising the at least one of the time stamp, the current speed of the vehicle, the GPS location, the payment information, and the weather information associated with the matching one of the first visual signatures and the stored second information comprising the at least one of the time stamp, the current speed of the vehicle, the GPS location, the payment information, and the weather information associated with the one of the second visual signatures;

an identifier recognition component which recognizes an identifier of one of the plurality of vehicles based on the second captured image of the vehicle when it is confirmed that the test is met; and a processor which implements the signature matching component, the information processing component, and the identifier recognition component.

19. The system of claim 18, wherein the first information comprises a first time stamp and the second information comprises a second time stamp which is later in time than the first time stamp, the test being a function of the first time stamp and the second time stamp.

20. A method for recognition of a vehicle identifier, comprising:
for each of a plurality of vehicles:
- with a first camera, capturing a first image of the vehicle at a first location at a first time,
- with a second camera, capturing a second image of the vehicle at a second location at a second time, later than the first time,
- acquiring first information associated with the capture of the first image,
- acquiring second information associated with the capture of the second image, the first and second information each comprising a respective time stamp,
- computing a first visual signature based on at least a part of the first image of the vehicle, the first visual signature being a statistical representation of pixels of the at least a part of the first image,
- computing a second visual signature based on at least a part of the second image of the vehicle, the second visual signature being a statistical representation of pixels of the at least a part of the second image,
- storing first visual signatures linked to the respective first information, the first visual signatures including the first visual signature for each of the plurality of vehicles, and
- storing second visual signatures linked to the respective second information, the second visual signatures including the second visual signature for each of the plurality of vehicles;

computing a measure of similarity between one of the second visual signatures and at least some of the first visual signatures to identify a matching one of the first visual signatures, based on the computed measure of similarity;

retrieving the stored first information associated with the matching one of the first visual signatures and stored second information associated with the one of the second visual signatures;

performing a test which includes computing a function of the time stamps of the retrieved stored first information and the stored second information; and when it is confirmed that the test is met, recognizing an identifier of one of the vehicles based on the captured first or second image of the vehicle.

* * * * *